United States Patent [19]
Einsel et al.

[11] Patent Number: 5,740,519
[45] Date of Patent: Apr. 14, 1998

[54] METHOD FOR THE TIME-CORRELATED TRANSMISSION OF A CONTROL SIGNAL AND A RADIO PROGRAM SIGNAL

[75] Inventors: Robert Einsel; Klaus Göken, both of Celle; Hans-Jörg Gessler, Villingen-Schwenningen, all of Germany

[73] Assignee: Telefunken, Hanover, Germany

[21] Appl. No.: 802,497

[22] Filed: Feb. 20, 1997

Related U.S. Application Data

[60] Continuation of Ser. No. 474,628, Jun. 7, 1995, abandoned, which is a division of Ser. No. 311,293, Sep. 23, 1994, which is a continuation of Ser. No. 154,426, filed as PCT/EP92/01166, May 25, 1992, abandoned.

[30] Foreign Application Priority Data

May 31, 1991 [DE] Germany .................. 41 17 787.8

[51] Int. Cl.$^6$ .................................................. H04B 1/04
[52] U.S. Cl. ........................... 455/45; 455/51.1; 455/103; 455/137; 455/70
[58] Field of Search .................... 455/45, 103, 186.1, 455/51.1, 68, 70, 72, 101, 102, 137, 139, 67.6, 273, 276.1; 375/216, 260; 348/512, 515, 518, 484, 485; 381/4, 13

[56] References Cited

U.S. PATENT DOCUMENTS

| | | |
|---|---|---|
| 3,593,147 | 7/1971 | Gurak . |
| 4,079,318 | 3/1978 | Kinoshita . |
| 4,278,978 | 7/1981 | Easterling et al. . |
| 4,314,372 | 2/1982 | Bakgaard . |
| 4,354,276 | 10/1982 | Karabinis . |
| 4,450,585 | 5/1984 | Bell . |
| 4,551,853 | 11/1985 | Deman et al. . |
| 4,789,993 | 12/1988 | Ryu . |
| 4,796,278 | 1/1989 | Naka . |
| 4,856,080 | 8/1989 | Hulkko . |
| 5,408,686 | 4/1995 | Mankovitz ........................ 455/45 |

FOREIGN PATENT DOCUMENTS

| | | |
|---|---|---|
| 2084791 | 12/1992 | Canada . |
| 360691 | 3/1990 | European Pat. Off. . |
| 3131303 | 2/1983 | Germany . |
| 33 11 646 | 10/1984 | Germany . |
| 3311647 | 10/1984 | Germany . |
| 3314566 | 10/1984 | Germany . |
| 267860 | 12/1986 | Germany . |
| 40 04 576 | 2/1990 | Germany . |
| 4017418 | 3/1991 | Germany . |
| 4016025 | 11/1991 | Germany . |
| 4020932 | 1/1992 | Germany . |
| 58-92161 | 6/1983 | Japan . |

OTHER PUBLICATIONS

DE–Z Plenge, Georg; U.A.: Variablke dynamik–ein Konzept fur verbesserte versorgung im Horfunk und Fernsehen IN: Rudfunktech Mitteilungen, Jg.30, H4, 1986 pp. 158–167.

*Primary Examiner*—Reinhard J. Eisenzopf
*Assistant Examiner*—Doris To
*Attorney, Agent, or Firm*—Joseph S. Tripoli; Peter M. Emanuel; Robert D. Shedd

[57] ABSTRACT

The invention involves a method of transmitting a control signal that is synchronized in time with a radio program signal. The control signal may be used, for example, in a receiver to restore dynamic range reduction that occurred at the transmitter. The method includes the steps of forming a first supplemented signal by inserting the control signal and a first time-reference signal into a data stream of a radio data signal such as an RDS signal. A second supplemented signal is formed by adding a second time-reference signal to the radio program signal. The first and second time-reference signals are correlated in time. The first and second supplemented signals are transmitted.

12 Claims, 7 Drawing Sheets

5,740,519

1

METHOD FOR THE TIME-CORRELATED TRANSMISSION OF A CONTROL SIGNAL AND A RADIO PROGRAM SIGNAL

This application is a continuation of application Ser. No. 08/474,628, filed Jun. 7, 1995 now abandoned, which is a division of application Ser. No. 08/311,293, filed Sept. 23, 1994, which is a continuation of application Ser. No. 08/154,426, filed Nov. 19, 1993 now abandoned, which is a continuation of PCT application PCT/EP 92/01166, filed May 25, 1992 by Robert Einsel, Klaus Goken and Hans-Jorg Gessler and titled "Process For The Radio Transmission Of A Control Varying In Time And Radio Receiver For Receiving Such A Control Signal". A method of transmission of this type is known from the main Pat. DE 40 04 576. U.S. Ser. No. 988 603, filed Sept. 14, 1992 by Robert Einsel, and titled "PROCESS FOR RADIO TRANSMISSION OF A TIME VARIANT CONTROL SIGNAL AND FOR RECEIVING SUCH A CONTROL SIGNAL".

FIELD OF THE INVENTION

The invention relates to a method of radio transmission of a control signal. A method of transmission of this type is known from the main Pat. DE 40 04 576.

The object of the main patent is to provide measures at the transmitting and receiving ends in order to be able to transmit and receive the time critical control signal for the variable dynamic.

BACKGROUND

The object of the additional patent is to provide measures at the transmitting and receiving ends in order to ensure an exact time correlated association of the time correlated control signal with the relevant signal portion of the radio programme signal.

As was described in the main patent, it is known from the DE-OS 33 11 646 to insert the control signal in the low frequency band region of the useful signal below 100 Hz, which is possible without having any audible influence on the useful signal. However, since the transmission capacity is relatively small in the low frequency edge region, the modulation of the control signal is adversely affected. Furthermore, the low frequency edge region is susceptible to interference, for example with respect to mains hum, so that overall, the transmission of the control signal in this region of the useful signal band is problematic. This appreciation led to the measure of integrating the control signal into the RDS data stream and hence of catering for an assured transmission and evaluation of the control signal.

SUMMARY OF THE INVENTION

One must of course rate the transmission of a constantly varying signal, such as a dynamic-auxiliary and reference signal, in the lower frequency region i.e. inaudibly, of the stereophonic sideband signal as critical but it is quite possible to inaudibly transmit a fixed signal, e.g. 60 Hz sine or cosine, in the lower frequency region which, both for the receiver and for the radio programme signal, is not critical. If a corresponding, simultaneously generated first time reference signal, which is inserted into the RDS data stream at the studio end, is associated with such a reference signal - hereinafter referred to as a second time reference signal, then an exactly time correlated or synchronous transmission of the variable auxiliary signals with the radio programme signal can be ensured at a transmitter.

2

Preferably, the second time reference signal represents a numerical value which is generated in the transmitter studio by a counter, that is synchronized by a signal or clock generator for the first time reference signal whereby, for its part, the clock generator can be very precisely synchronized by a radio controlled clock. The second time reference signal or pilot signal controls a further counter in the transmitter which has an output that is connected to a first input of a comparator circuit to which the counter value of the RDS data signal is fed over a second input. From the comparison of the counter values, an adjustment value can be derived by means of which delay stages can be controlled, which control circuits, as necessary, delay either the radio programme signal or the RDS data stream relative to one another in such a way that an exact uniting of the RDS data stream with the radio programme signal is possible. Preferably, the RDS or control signal data items associated with a corresponding signal portion of the radio programme signal are transmitted, in time, before the corresponding portion.

The invention can be realized particularly advantageously in radio receivers having a plurality of tuning units which are capable of receiving the same radio programme at different frequencies whereby the radio programme signal contains, as previously described, an auxiliary signal that is associated, exactly time correlated, with a particular content of the radio programme signal. In addition to the processing of the variable auxiliary signals during the reproduction, further embodiments achieving an improved quality of reproduction can be realized.

To this end, a demodulator and a decoder are associated with each receiver unit, or a common demodulator and decoder are associated with both receiver units, for the demodulation and decoding of the auxiliary signals contained in the radio programme signal. Moreover, a comparator device is provided which compares the auxiliary signals with each other and, from the comparison, determines an adjustment value which represents a measure for the time delay or lead of one radio programme signal relative to the other.

For the exact superimposition in time of the two radio programme signals, a variable delay stage is located in the signal path of each receiver unit (or, a common one for both receiver units), whereby the delay stages are controlled by a synchronizing device to which the adjustment value from the comparator device is supplied. The synchronizing device synchronizes the similar radio programme signals from different transmitters on a standard, coincident time axis via the delay stages (or the delay stage).

The radio programme signals from a plurality of receiver units, which are synchronized on the coincident time axis, are superimposed or faded together whereby there ensues a resultant radio programme signal which is emitted by a reproduction device e.g. a loudspeaker. Here, the invention makes use of the knowledge that, with the overlapping of radio programme signals from different transmitters, various interferences are also detrimental to the individual radio programme signals. If now, the radio programme signals, which are synchronized on the coincident time axis, are superimposed or faded together, the interferences are added much less, or play a much reduced role, relative to the useful part of the radio programme signals than in the individual radio programme signals.

Preferably, the decoder in the radio receiver is an RDS decoder, the comparator device is a bit pattern comparator that carries out a comparison of the RDS data items inserted at transmitting studio end into the data stream of a radio data signal (RDS signal) and determines the difference in transit times of identical bit patterns associated with one another. Since the bit patterns of the control signals in all of the radio programme signals of the different transmitters are associated with the same radio programme signal content, corresponding adjusting values can be derived from the difference in transit times of these bit patterns, with which, one or more delay stages can then be controlled.

BRIEF DESCRIPTION OF THE DRAWING

The invention will be explained in detail hereinafter by means of an embodiment. In the drawings.

DETAILED DESCRIPTION

Figure 1:
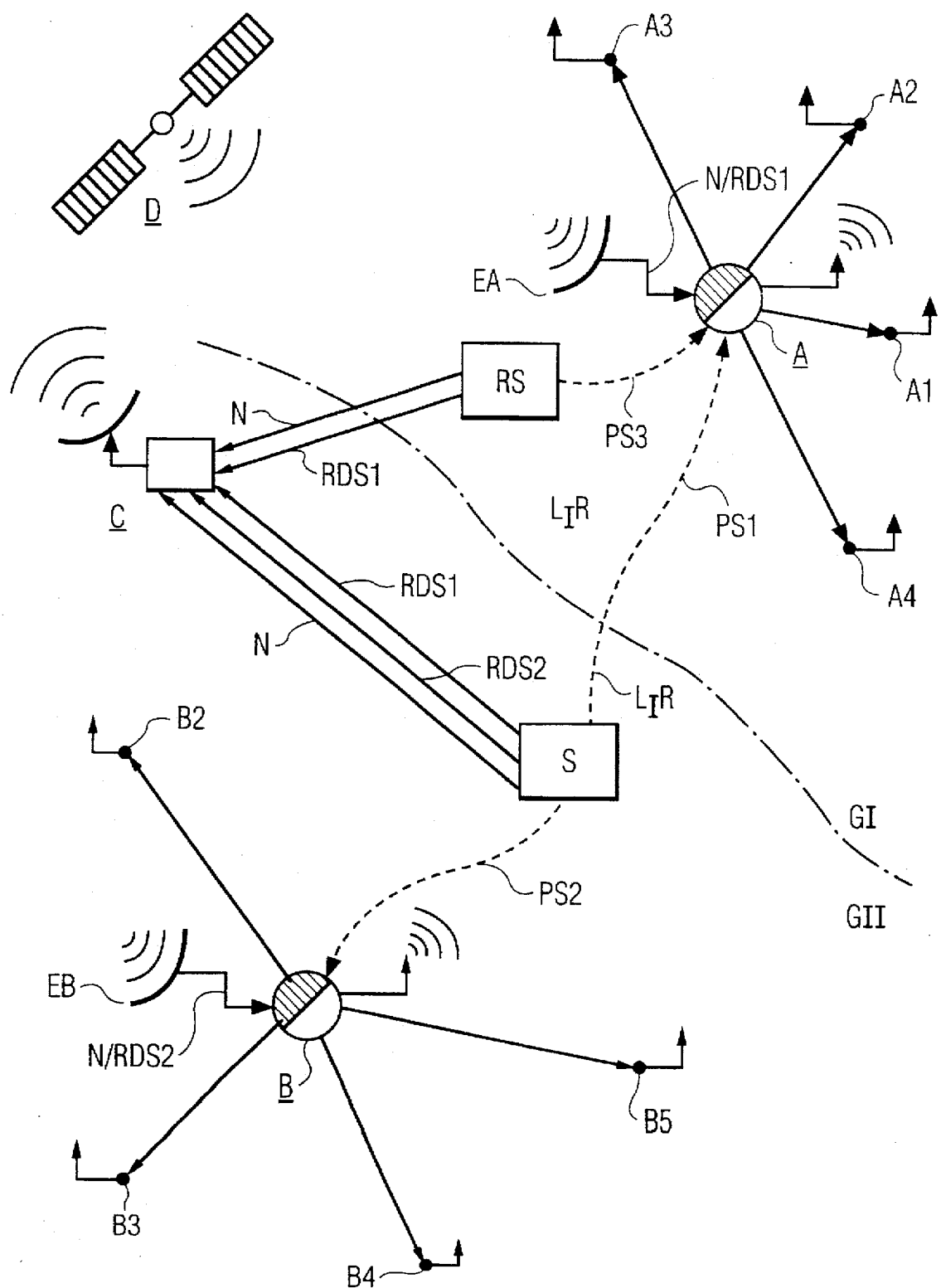
FIG. 1 illustrates a schematic representation of the radio coverage of a transmission area comprising two partial regions in accordance with the method of transmission in accordance with the invention, FIG. 2 a block circuit diagram of a master transmitter that is adapted for the method of transmission in accordance with FIG. 1, FIG. 3 a block circuit diagram of a radio receiver for the reception and evaluation of the control signals for the variable dynamic transmitted in accordance with the method of transmission in accordance with FIG. 1, FIG. 4 a simplified block circuit diagram of a transmitter studio adapted for the method of transmission in accordance with the invention, FIG. 5 a simplified block circuit diagram of a master transmitter that is adapted for the method of transmission in accordance with the invention, FIG. 6 a simplified block circuit diagram of a radio receiver that is adapted for the method of transmission in accordance with the invention, FIG. 7 an alternative partial block circuit diagram to FIG. 6.

The radio coverage area underlying the illustration in FIG. 1, for the VHF coverage with for example the first radio programme of the Norddeutschen Rundfunk, NDR1, has a first partial region GI (e.g. Schleswig-Holstein) and a second partial region GII (e.g. Hamburg). The radio programme, here NDR1; is "regionalized" at certain times i.e. the same programme is transmitted in the two partial regions GI, GII at certain transmission times and different programmes are transmitted at certain other transmission times. Since, during such a "regionalization", the RDS items of information for, for example, programme name (PS), programme identification on number (PI) and alternative frequencies (AF) are different, this special state of affairs has to be taken into account in a manner that is about to be described.

The coverage area has a main transmitter studio S which produces the super-regional radio programme as well as the regional programme for the second partial region GII. A regional studio RS that is distantly located therefrom only produces the regional programme for the first partial region GI. The two studios S and RS are connected via a post office cable link PS2 and PS3 respectively to a master transmitter B (for the second partial region GII) and A (for the first partial region GI). Further, the main transmitter studio S is connected via a post office cable link PS1 to the master transmitter A. In the event of a super-regional programme, the main transmitter studio S supplies both master transmitters A and B with the radio programme signal which is transmitted as a left (L) and right (R) signal over the post office cable links PS1 and PS2. In the event of a regional transmission for the second partial region GII, the main transmitter studio S only supplies the master transmitter B with the "GII" programme signal while the regional studio RS only supplies the master transmitter A with the "GI" programme signal.

The master transmitter A is connected via lines or relay links to slave transmitters A1 to A4 while the master transmitter B is connected in a similar manner to slave transmitters B1 to B4.

In addition to or instead of the connections via the post office cable links PS1 to PS3, the studios S and RS may be connected over digital links N/RDS1/RDS2 and N/RDS1 respectively to an earth radio station C of a satellite communication link. This extends from the earth radio station C over a radio satellite D to the parabolic receiving antennae EA or EB of a satellite receiving station at the locations of the master transmitters A or B.

Since as already mentioned - for the "regionalization" of the programme, here NDR 1, different items of RDS data are to be transmitted for the two partial regions GI, GII, the satellite communication link has a single, digital, useful signal-channel N and two separate auxiliary signal channels referenced. RDS1 and RDS2. The master transmitter A receives only the one auxiliary signal channel RDS1 in addition to the digital, useful signal channel N whereas the master transmitter B only receives the other auxiliary signal channel RDS2 in addition to the digital, useful signal channel N. In the case of a super-regional transmission (which is only emitted by the main transmitter studio S) the items of RDS data for the auxiliary signal channels RDS1 and RDS2 are identical.

What is fundamental to the invention is that the items of RDS data have already been generated and formatted in the main transmitting studio S and, if necessary, in the regional transmitter RS whereby the time critical control signals for the variable dynamic are inserted with a special identification into the RDS data stream exactly time correlated with the useful signal (analogue or digital) and are then transmitted to the master transmitters A, B.

The master transmitters A, B receive, in a manner that is to be described, the associated RDS data stream including the control signal for the variable dynamic, and insert the received RDS data stream, time correlated, into the multiplex signal which is formed from the L and R signals of the useful signal received at the master transmitters A, B by matrixing and FM modulation with a 38 kHz suppressed carrier.

Figure 2:
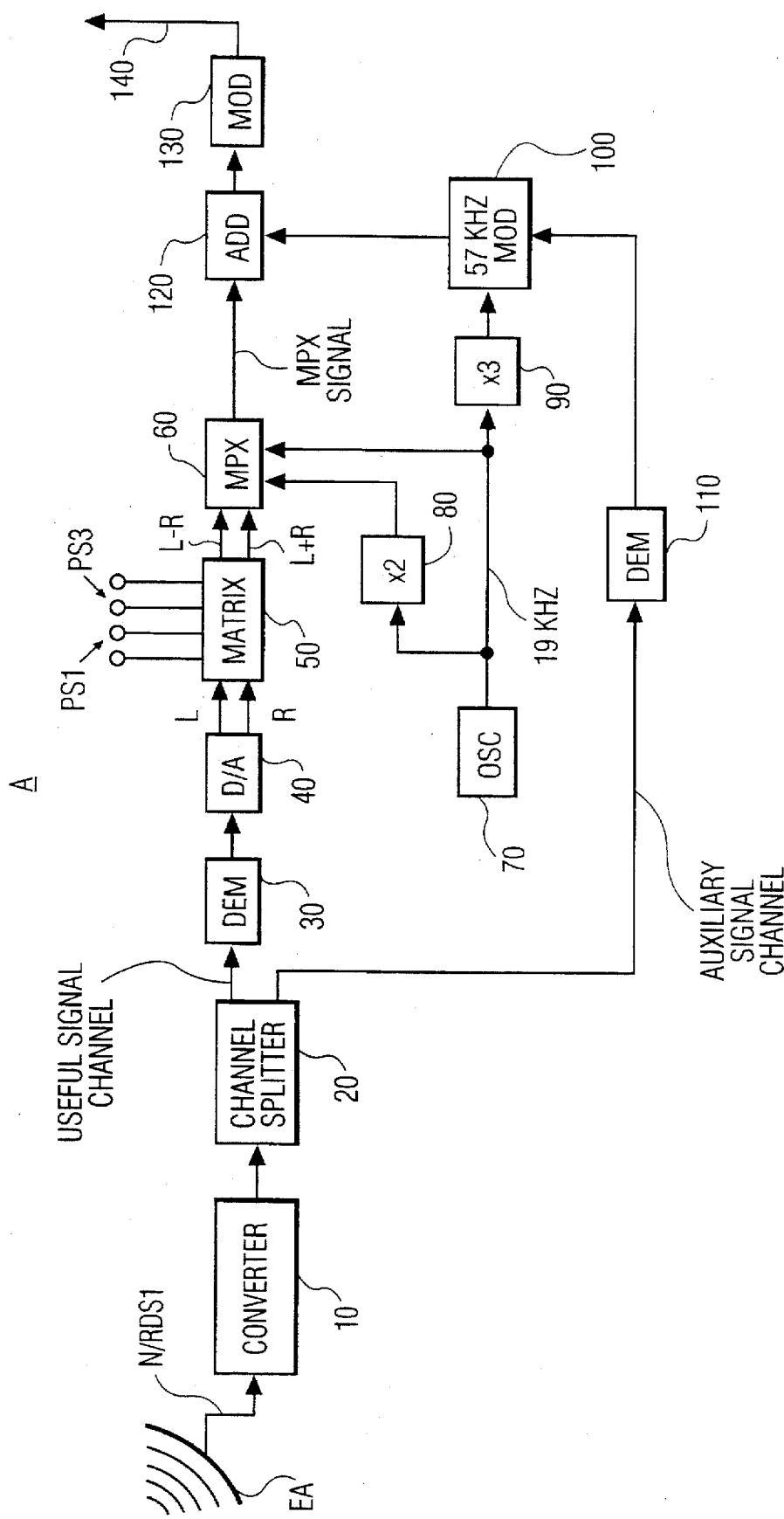

The master transmitter A schematically illustrated in FIG. 2 with the aid of a block circuit diagram has the same construction as the master transmitter B. The master transmitter A receives the useful signal and auxiliary signal channels N and RDS1 transmitted from the radio satellite D via the parabolic receiving antenna EA. A conversion of the 12 GHz RF frequency to approximately 800 kHz occurs in the converter 10 (outdoor unit) whereafter, a splitting into the useful signal channel and the auxiliary signal channel occurs in a channel splitter 20.

The useful signal N is then demodulated in a demodulator 30. The thus obtained base band signal is reconverted into an analogue signal in a digital/analogue converter 40 whereafter, the resulting L and R signals are fed to a stereo matrix 50 in order to obtain the matrices L+R and L-R corresponding to the VHF norm. The matrixed signals are converted in a multiplexer 60 into a multiplex signal in which the (L+R) signal and the (L-R) signal are disposed in the frequency band 0–15 kHz and the frequency band 23–53 kHz respectively. To this end, the (L–R) signal is modulated in FM onto a 38 kHz carrier which is thereafter suppressed. Further, a 19 kHz pilot tone is inserted into the frequency gap between the (L+R) and the (L–R) band. The 19 kHz pilot tone is taken from a 19 kHz oscillator 70 while the 38 kHz carrier is obtained by doubling the 19 kHz pilot tone in a doubler stage 80.

The multiplex signal at the output of the multiplexer 60 is supplied to an adding stage 120 whose second input is connected to a 57 kHz modulator 100. A 57 kHz sub carrier, which is generated by tripling the 19 kHz pilot tone in a tripler stage 90, is supplied to the modulator 100. The RDS data stream is directly modulated onto this sub carrier (in 2 PSK modulation) which is received in the auxiliary signal channel and demodulated there by the demodulator 110 into the base band. A recoding of the demodulated RDS data stream is not required.

The adding stage 120 inserts the modulated 57 kHz sub carrier, which is supplied to it via the modulator 100, into the multiplex signal coming from the multiplexer 60, which multiplex signal, after this insertion, is modulated in a modulator 130 onto the RF carrier of the master transmitter A in FM and is transmitted as a radio signal via the transmitter antenna 140. As a result of this essentially undelayed reception of the RDS data stream including the control signal for the variable dynamic, an exact, time correlated insertion of the modulated RDS data stream into the multiplex signal can be ensured. A possible time displacement between the useful signal channel and the auxiliary signal channel, such as could be caused by different circuit constructions in the two signal processing branches or by different transmission links—for example, useful signal via a post office cable link 1, and the auxiliary channel over a satellite transmission link—can be corrected by means of suitable devices such as transit time members, delay lines or the like.

The RDS data stream is transmitted over the satellite transmission link to the master transmitters A, B even in the case of an exclusive or additional routing of the useful signal via a post office cable connection (here, PS1 and PS3). The stereo matrix 50 has additional inputs for the termination of the post office cable connection. The additional post office feed-in of the useful signal has a fall back function for the case that the satellite transmission of the useful signal is subject to disturbance.

Figure 3:
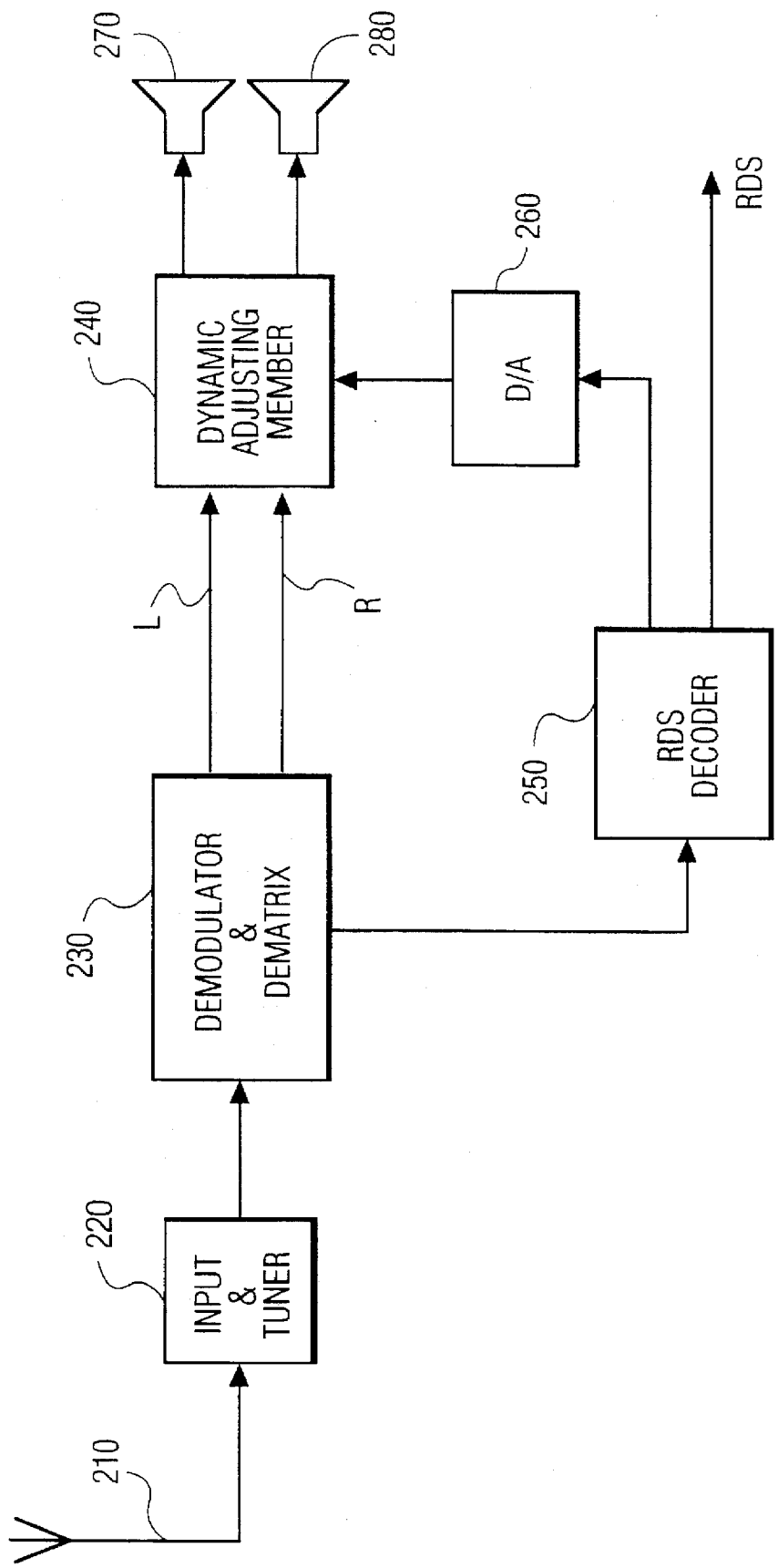

A radio receiver illustrated in FIG. 3 feeds the antenna signal present on a receiving antenna 210 to an input and tuner stage 220 where the wanted radio signal is obtained from the antenna signal and is supplied to a demodulator and de-matrixing stage 230. The multiplex signal, from which the (L+R) signal and, by FM demodulation of the suppressed 38 kHz carrier, the (L–R) signal are separated out, is obtained in the stage 230 by FM demodulation of the RF carrier. By de-matrixing the (L+R) and (L–R) signals, one obtains, as AF signals at the output of the stage 230, the stereophonic left (L) and right (R) signals which are fed to a dynamic adjusting member 240.

Furthermore, the 57 kHz carrier is separated out from the multiplex signal and demodulated in the stage 230 whereby the RDS data stream resulting therefrom is led to an RDS decoder 250. In the RDS decoder 250, the control signal for the variable dynamic inserted therein is separated out with the aid of its aforementioned identification from the rest of the RDS data stream, decoded and fed to a digital/analogue converter 260 which produces an analogue control signal from the digital control signal. This analogue control signal controls the dynamic adjusting member 240 in a manner such that the original dynamic of the stereophonic radio programme signal is completely or at least partially reconstructed. The reconstructed stereophonic signal is reproduced by means of loudspeakers 270, 280. The remaining portions of the RDS data stream are decoded in the RDS decoder 250 and are made available as items of RDS information for further use in the receiver.

Figure 4:
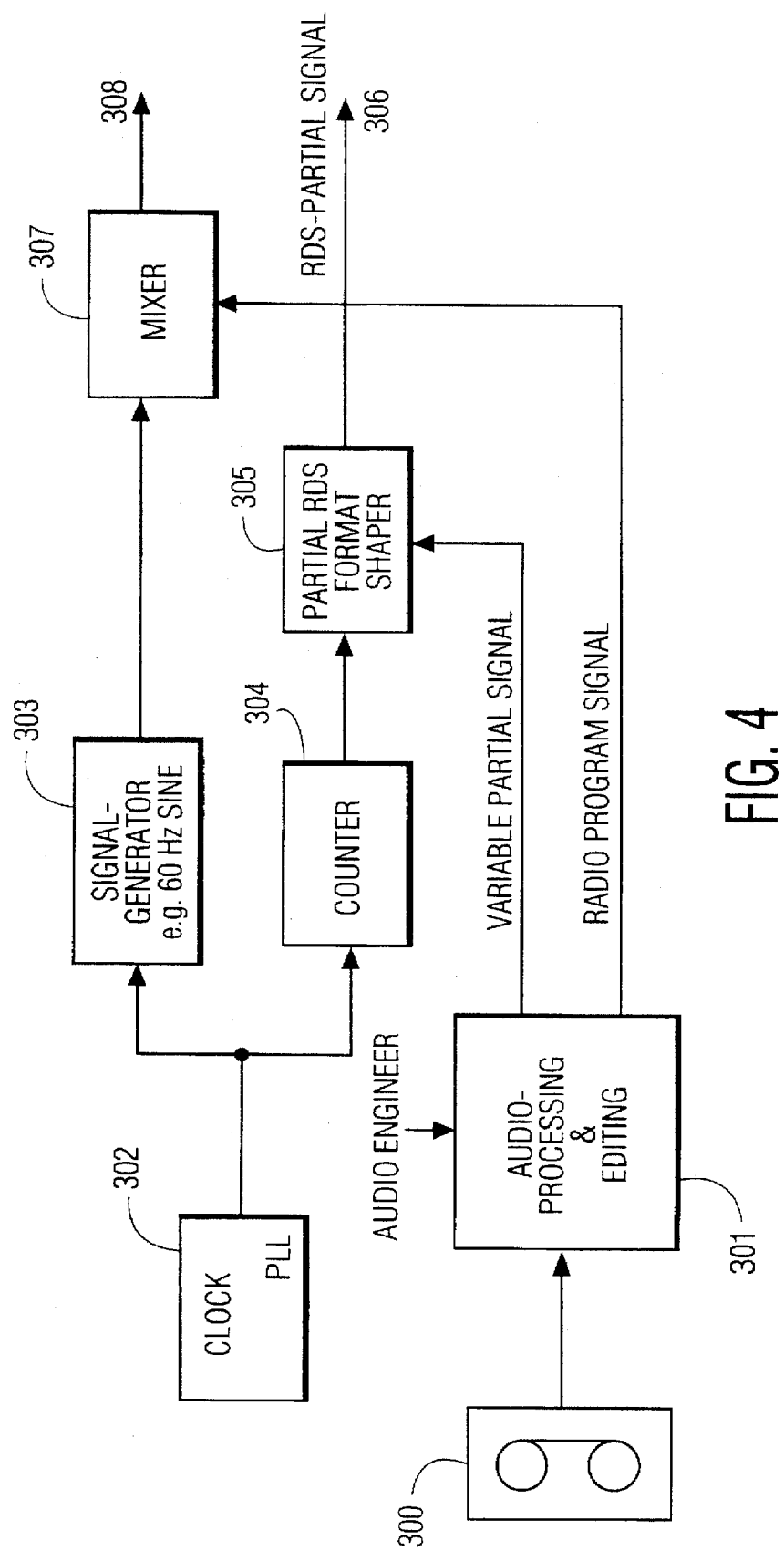

A simplified block circuit diagram of a transmitting studio is depicted in FIG. 4 in order to establish the time correlation between the radio programme signal and the variable control or auxiliary signals. The items of audio data are extended from a sound source e.g. a magnetic tape device 300, to an audio processing and editing circuit 301. A sound engineer can exercise control over this circuit in that he alters the dynamics of the audio data for example. As is known from "Rundfunktechnische Mitteilungen", 1986, Vol 4, pp 158 to 167, the subsequent regeneration of the optimal, dynamic control signal can also be effected by a processor.

The corresponding dynamic-adjusting or control or auxiliary signal appertaining to a radio programme signal is fed to an RDS partial format shaper 305. The RDS partial format shaper 305 produces a partial RDS signal 306 from the variable auxiliary signal and a counter signal of a counter 304, hereinafter referred to as a first time reference signal. The counter 304 receives a count or clock pulse from a clock generator 302. The counter counts up by one counting step for each clock pulse so that the first time reference signal alters with each clock pulse. The clock generator 302 may be constructed as a PLL (Phase Locked Loop) or clock pulse generator for example and, for its part, may be controlled by a clock e.g. a radio controlled clock (Bundespost - National German Post Office frequency 77.5 kHz). A signal generator 303 is triggered by the same clock pulse from the clock generator 302 simultaneously with a counter pulse whereby the signal generator produces in turn a fixed defined signal having a pre-arranged frequency, hereinafter referred to as the second time reference signal. This may, for example, be a sine signal whose frequency, is a function of the clock pulse. In accordance with the arrangement, the signal generator produces a sine signal of 60 Hz for a clock signal of 60 clock pulses per second (equally distributed) and, meanwhile, the counter counts on by 60 further count values.

From the audio processing and editing circuit, the actual items of audio data, which are later transmitted by a transmitter as audible radio programme signals, reach a mixer 307. The mixer assembles a resultant signal 308 from the radio programme signal and the second time reference signal of the signal generator. Thereby, the time reference signal from the signal generator is mixed with the radio programme signal inaudibly in the lower frequency range.

The radio programme signal 308 and the partial RDS signal 306 reach a master transmitter together, over separate transmission links or over a common transmission link. It is assumed in the following that the two signals 306 and 308 reach the master transmitter over separate transmission links.

By virtue of the circuit arrangement in the transmitting studio, it is ensured that there is associated with each variable auxiliary signal, a count signal or first time reference signal which can be exactly associated with a corresponding second time reference signal in the radio programme signal since the counter as well as the signal generator are triggered by the same clock generator.

Figure 5:
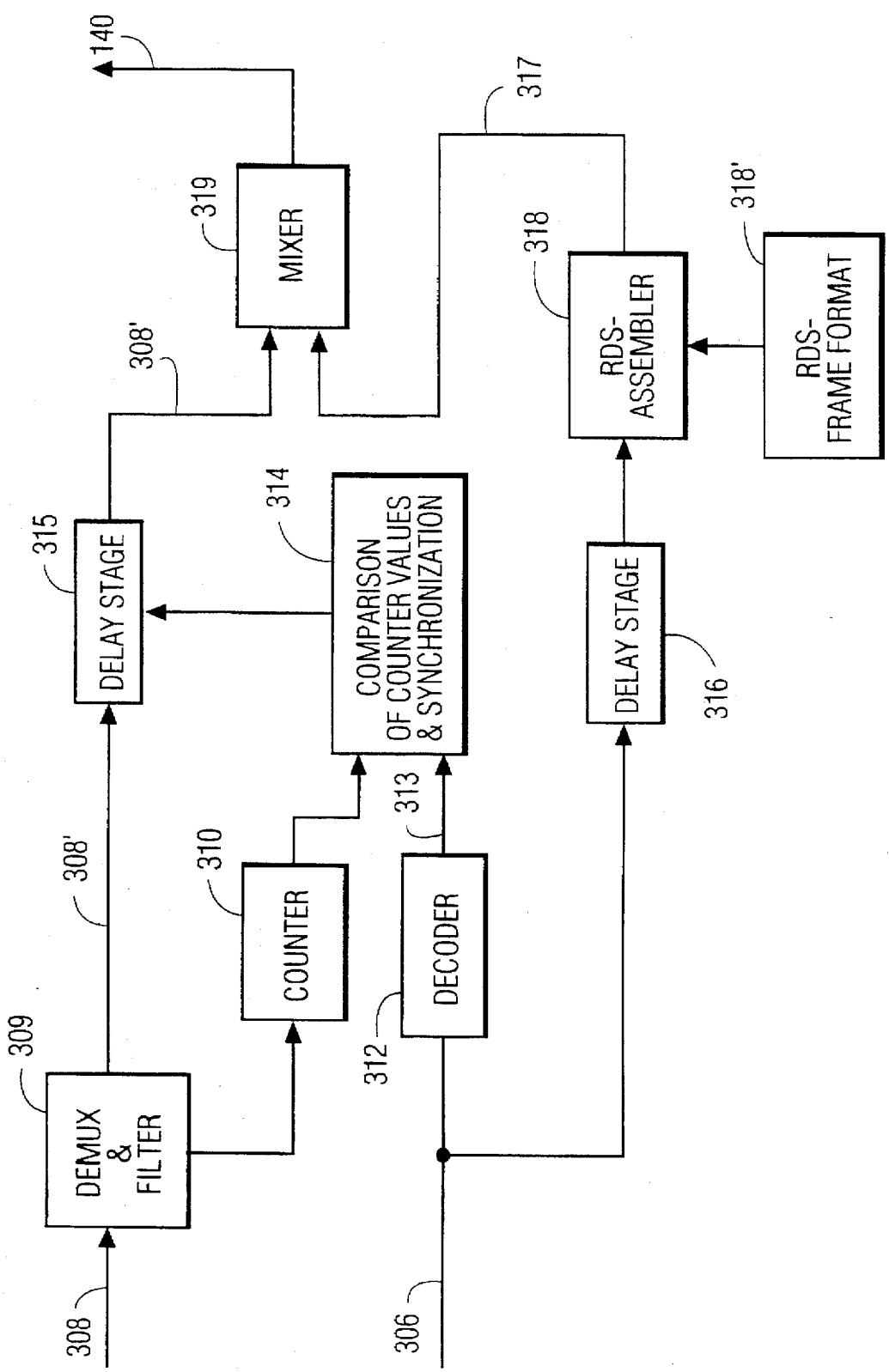

FIG. 5 depicts a simplified block circuit diagram of a master transmitter as an alternative to the one already depicted in FIG. 2. The radio programme signal is initially fed to a circuit unit 309 which is constructed as a demultiplexer or decoder and which decodes the second time reference signal of the signal generator 303 from the radio programme signal. Moreover, the second time reference signal is filtered out from the radio programme signal so that only the radio programme signal 308', without the second time reference signal, is available at the output of the demultiplexer 309. The second time-reference signal is supplied to a counter 310. The counter is caused to count by the decoded second time reference signal whereby the counter 310 is synchronized to the same clock rate as the counter 304 in the transmitting studio.

The partial RDS signal 306 is fed to a decoder 312 which decodes the first time reference signal of the counter 304 from the partial RDS signal. The first time reference signal of the decoder 312 as well as the second time reference signal of the counter 310 are fed to a circuit unit 314 consisting of a comparator for the comparison of the count values and to a synchronizing device. From the comparison of the count values, it can be determined unambiguously as to which of the count signals leads or lags relative to the other or as to whether the RDS signal leads or lags the radio programme signal associated therewith. In the most simple manner, the comparison of the count values is reduced to a bit pattern comparison. Thus, the time, with which as an adjustment value either the radio programme signal or the partial RDS signal has to be delayed, can be derived from the clock rate of the bit pattern and the comparison. A respective variable delay stage 315 and 316 is arranged in the signal path of the radio programme signal and of the RDS signal for producing the delay. The delay stages are controlled by the synchronizing device in such a manner that radio programme signals and RDS signals, which are associated with each other and which are correlated on a coincident time axis, are present on each occasion at the output of the delay stages.

An RDS assembling circuit 318, which assembles the final RDS signal 317 from the partial RDS signal 306 and the RDS frame format 318', is present in the signal path of the RDS signal. The RDS assembler may be arranged in front of or after the delay stage 316. The RDS frame format 318' consists of the invariable RDS signals for a transmission or a transmitter.

The resulting RDS signal 317 as well as the radio programme signal 307 are fed to a mixer 319 and, as previously described, transmitted over the transmitter antenna 140. The mixer thereby has the functions of the adder 120 and of the modulator 130 as was described with reference to FIG. 2.

Figure 6:
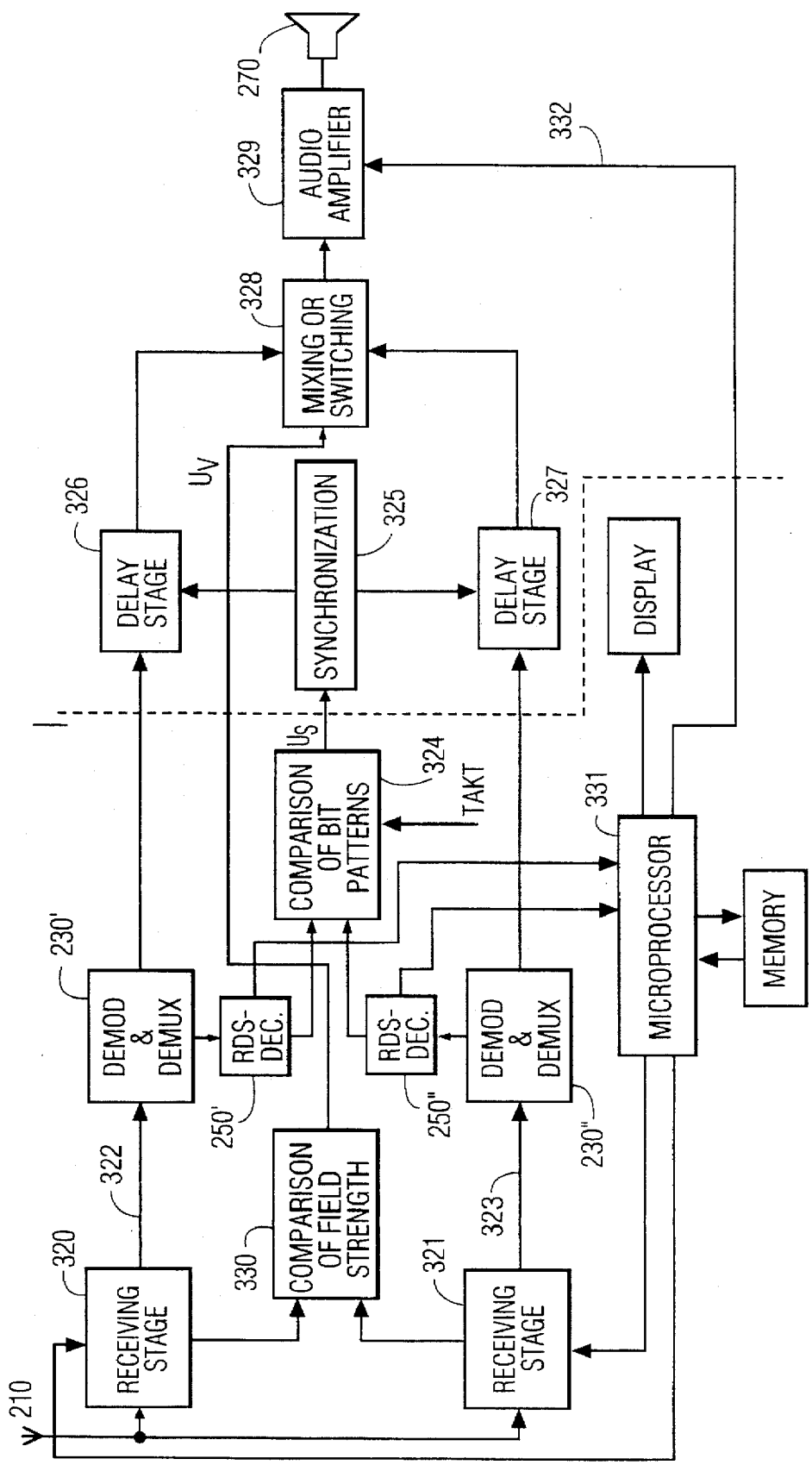

FIG. 6 depicts an alternative block circuit diagram to FIG. 3 in which, in particular, use is made of the fact that a variable auxiliary signal, which are associated with a certain radio programme signal, is contained in the RDS signal.

The radio receiver in accordance with FIG. 6 has two receiving sections 320 and 321 which are connected to the receiving antenna 210. Thus, the radio receiver has two receiving units 322 and 323. From the receiving section of each receiving unit, where the wanted radio signal is obtained from the antenna signal, the radio signals reach a demodulator and de-matrixing stage 230' and 230". As described with respect to FIG. 3, the multiplex signal is obtained in the stage 230 by FM demodulation of the RF carrier. Further, the 57 kHz carrier is separated out from the multiplex signal and demodulated in the stages 230' and 230" whereby the RDS data stream resulting therefrom is led to a respective RDS decoder 250' and 250". In the RDS decoders 250' and 250", the first time reference signal inserted therein or, by virtue of its identification, the variable auxiliary signal, is separated from the other portions of the RDS data stream, decoded and supplied to a comparator circuit 324. The comparator circuit determines an adjustment value $U_z$, which is a measure as to how much the radio programme signal of one receiver unit leads or lags relative to the other, from the comparison of matching bit patterns of the first time reference signals or of the auxiliary signals. The adjustment value is supplied to a synchronizing circuit 335 which controls the delay stages 326 and 327 present in the signal path of the receiving units. The synchronizing circuit ensures that radio programme signals having the same content at the input of the delay stages are exactly synchronized in time on a coincident time axis. The delay stages are constructed as variable delay stages so that the radio programme signals of the receiving units can be individually delayed.

The radio programme signals at the output of the delay stages are fed to a fading or switching device. For fade-in, the two radio programme signals are added in known manner whereby the signal to noise ratio is considerably improved. Thereafter, the resulting radio programme signal is supplied in known manner to the AF amplification stage 329 and reproduced in a reproduction device. The AF amplification exhibits in addition, the dynamic adjusting means 240 shown in FIG. 3. For reasons of greater clarity, the illustration of the stereophonic signals L and R is dispensed with in FIG. 6.

Moreover, the radio programme signals 322 and 323 of the two receiver units can be supplied in addition to a field strength comparator 330 which, on the one hand, measures the respective field strengths of the received radio programme signals and then compares the measured field strengths of the receiver units with each other. From the result of the comparison, there is derived an adjustment value $U_v$, which is supplied to the fading or switching device 328. If the adjustment value $U_v$, exceeds a pre-selected threshold value then the radio programme signals of the receiver units are not faded together but rather, only the strongest is passed on to the AF amplification stage 329. The weaker radio programme signal is not then mixed with the stronger one. Such a switch over is useful especially when the difference in field strengths between the two radio programme signals is very great and the field strength of the most strongly received radio programme signal lies above a desired threshold value since then, the fading in of a radio programme signal having a weaker field strength scarcely implies any improvement of the resulting radio programme signal.

The complete RDS data stream of the two receiver units is supplied to a microprocessor 331 for evaluation as was described with respect to FIG. 3. The microprocessor (which may also contain a D/A converter) selects from the table of the alternative frequencies of a radio programme, on each occasion, the two strongest received radio programme signals of a radio programme by means of a control action on the two receiver sections and with the assistance of the field strength measurement of the field strength comparator 330 whereby both radio programme signals are transmitted by different transmitters. The microprocessor is connected via a lead 332 to the dynamic adjusting means integrated into the AF amplifier and controls the adjusting means in the desired manner (see FIG. 3).

Figure 7:
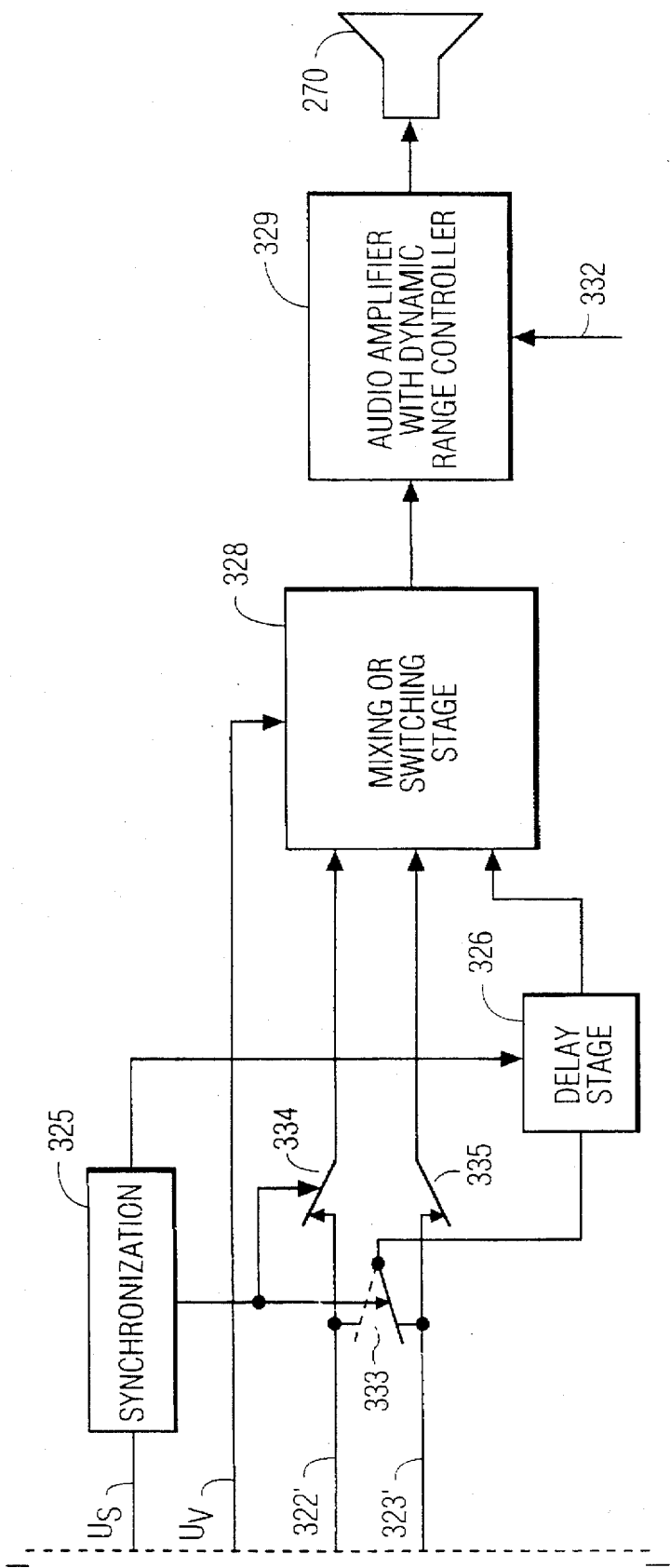

As is depicted in FIG. 7, a delay stage need not necessarily be located in the signal path of each one of the receiver units. The corresponding, required delay can also be realized with only one delay stage for two receiver units. It has been shown that, in general, for a radio receiver having N receiver units, only N−1 delay stages are necessary in order to synchronous the radio programme signals of a radio programme from different transmitters onto a coincident time axis. The signal path of the receiver unit that is to be delayed is diverted over the variable delay stage and the signal path of the other receiver unit is led directly to the fading or switching stage by a switch-over circuit device consisting of the switches 333, 334 and 335 that are controlled by the synchronizing device.

We claim:

1. A method of transmitting a control signal correlated in time with a first radio program signal, said control signal containing information concerning a dynamic range of said radio program signal, said control signal being utilized in a receiver for modifying a dynamic range of a second radio program signal produced by said receiver in response to said first radio program signal, said method comprising the steps of:

generating a first time reference signal and a second time reference signal synchronized with said first time reference signal:

forming a first supplemented signal by inserting said control signal and said first time-reference signal into a data stream of a radio data signal;

forming a second supplemented signal by adding said second time-reference signal to said first radio program signal; and transmitting said first and second supplemented signals.

2. The method of claim 1 wherein said first time-reference signal is a time varying signal and said second time-reference signal is added to a low frequency portion of said first radio program signal.

3. The method of claim 1 wherein the step of generating said first and second time-reference signals comprises the step of generating a count value responsive to a clock signal; said first time-reference signal comprising said count value.

4. The method of claim 2 wherein one of said first and second time reference signals is used in a transmitting/receiving device to control at least one receiving function.

5. A method of transmitting a control signal correlated in time with a first radio program signal, said control signal containing information concerning a dynamic range of said radio program signal, said control signal being utilized in a receiver for modifying a dynamic range of a second radio program signal produced by said receiver in response to said first radio program signal, said method comprising the steps of:

forming a first supplemented signal by inserting said control signal and a first time-reference signal into a data stream of a radio data signal;

forming a second supplemented signal by adding a second time-reference signal to said first radio program signal; and transmitting said first and second supplemented signals; wherein said first time-reference signal is transmitted during distinct time intervals.

6. The method of claim 5 wherein said first time-reference signal is a time varying signal and said second time-reference signal is added to a low frequency portion of said first radio program signal.

7. The method of claim 5 wherein the step of forming said first supplemented signal comprises the step of generating a count value responsive to a clock signal; said first time-reference signal comprising said count value.

8. The method of claim 5 wherein one of said first and second time reference signals is used in a transmitting/receiving device to control at least one receiving function.

9. A method of transmitting a control signal correlated in time with a first radio program signal, said control signal containing information concerning a dynamic range of said radio program signal, said control signal being utilized in a receiver for modifying a dynamic range of a second radio program signal produced by said receiver in response to said first radio program signal, said method comprising the steps of:

forming a first supplemented signal by inserting said control signal and a first time-reference signal into a data stream of a radio data signal;

forming a second supplemented signal by adding a second time-reference signal to said first radio program signal; and transmitting said first and second supplemented signals; wherein the step of transmitting said first and second supplemented signals is followed by the steps of:

receiving said first and second supplemented signals;

producing a data signal including said first time-reference signal and said control signal from said first supplemented signal;

filtering said second time-reference signal out of said first radio program signal to produce a filtered signal;

retransmitting said filtered signal and said data signal.

10. The method of claim 9 wherein said first time-reference signal is a time varying signal and said second time-reference signal is added to a low frequency portion of said first radio program signal.

11. The method of claim 9 wherein the step of forming said first supplemented signal comprises the step of generating a count value responsive to a clock signal; said first time-reference signal comprising said count value.

12. The method of claim 9 wherein one of said first and second time reference signals is used in a transmitting/receiving device to control at least one receiving function.

* * * * *